(12) United States Patent
Shibusawa

(10) Patent No.: US 11,317,003 B2
(45) Date of Patent: Apr. 26, 2022

(54) IMAGE PROCESSING APPARATUS, METHOD, AND PRODUCT FOR CORRECTING SECTION OF ABNORMAL IMAGE BASED ON POSITION IN ABNORMAL LINE IMAGE

(71) Applicant: Naoki Shibusawa, Kanagawa (JP)

(72) Inventor: Naoki Shibusawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/221,941

(22) Filed: Apr. 5, 2021

(65) Prior Publication Data
US 2021/0321015 A1    Oct. 14, 2021

(30) Foreign Application Priority Data
Apr. 14, 2020  (JP) .............................. JP2020-072256

(51) Int. Cl.
*H04N 1/40*     (2006.01)
*H04N 1/00*     (2006.01)
*H04N 1/04*     (2006.01)
*H04N 1/409*    (2006.01)

(52) U.S. Cl.
CPC ..... *H04N 1/40093* (2013.01); *H04N 1/00005* (2013.01); *H04N 1/00037* (2013.01); *H04N 1/00071* (2013.01); *H04N 1/00082* (2013.01); *H04N 1/04* (2013.01); *H04N 1/409* (2013.01)

(58) Field of Classification Search
CPC ........... H04N 1/00005; H04N 1/00037; H04N 1/00071; H04N 1/00082; H04N 1/40093; H04N 1/401; H04N 1/409; H04N 1/58; H04N 1/62; G06T 5/005
See application file for complete search history.

(56) References Cited

U.S. PATENT DOCUMENTS

| | | | |
|---|---|---|---|
| 2003/0012452 A1* | 1/2003 | Trifonov | G06T 5/20 382/275 |
| 2013/0135637 A1* | 5/2013 | Ohira | G06K 9/346 358/1.9 |

FOREIGN PATENT DOCUMENTS

| | | |
|---|---|---|
| JP | 2002-141874 | 5/2002 |
| JP | 2003-023513 | 1/2003 |
| JP | 2003-046709 | 2/2003 |
| JP | 2011-239176 | 11/2011 |
| JP | 2018124873 A * | 8/2018 |

* cited by examiner

Primary Examiner — Scott A Rogers
(74) Attorney, Agent, or Firm — IPUSA, PLLC

(57) ABSTRACT

An image processing apparatus includes a memory and processing circuitry electrically coupled to the memory. The processing circuitry is configured to correct image data in a section of an abnormal image, based on information that indicates a position of the section in an abnormal line image that is included in a received image. The processing circuitry is configured to output the corrected image data.

9 Claims, 14 Drawing Sheets

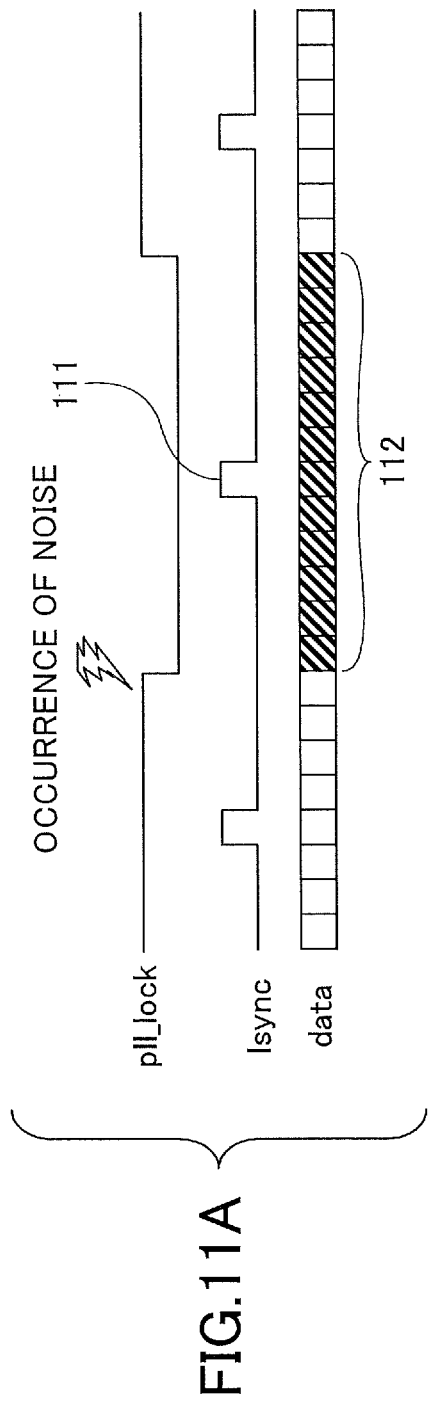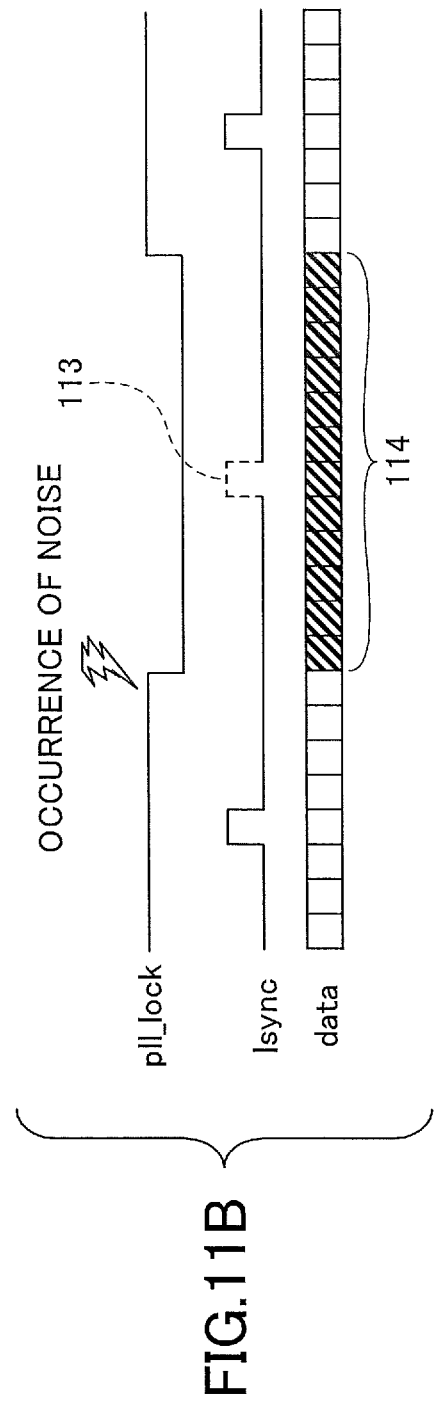

IMAGE PROCESSING APPARATUS, METHOD, AND PRODUCT FOR CORRECTING SECTION OF ABNORMAL IMAGE BASED ON POSITION IN ABNORMAL LINE IMAGE

CROSS-REFERENCE TO RELATED APPLICATION

The present application claims priority under 35 U.S.C. § 119 to Japanese Patent Application No. 2020-072256, filed Apr. 14, 2020, the contents of which are incorporated herein by reference in their entirety.

DESCRIPTION OF THE RELATED ART

1. Field of the Invention

The present disclosure relates to an image processing apparatus, a method for processing images, and a storage medium.

2. Description of the Related Art

For image processing apparatuses that transfer image data in accordance with line synchronization signals, techniques are known to correct abnormal images caused by transfer error occurring during image transfer.

When such abnormal images are caused by transfer error during data transfer through synchronous (isochronous) transfer for ensuring a fixed bandwidth, the transfer error is detected to correct the abnormal image (see, for example, Japanese Unexamined Patent Application No. 2003-046709, which is referred to as Patent document 1).

Further, when an abnormal image is produced within a fixed period during which image data for one line is transferred, the abnormal image is corrected with reference to line image data that is stored in a line memory, where the line image data is stored before and after occurrence of error (see, for example, Japanese Unexamined Patent Application No. 2011-239176, which is referred to as Patent document 2).

SUMMARY

According to one aspect of the present disclosure, an image processing apparatus includes a memory and processing circuitry electrically coupled to the memory. The processing circuitry is configured to correct image data in a section of an abnormal image, based on information that indicates a position of the section in an abnormal line image that is included in a received image. The processing circuitry is configured to output the corrected image data.

BRIEF DESCRIPTION OF THE DRAWINGS

FIG. 11A is a timing chart illustrating an example of occurrence of the abnormality in image data;

FIG. 11B is a timing chart illustrating an example of occurrence of abnormalities in both of image data and a line synchronization signal;

DESCRIPTION OF THE EMBODIMENTS

An object of the present disclosure is to correct an abnormal image without degrading image quality.

One or more embodiments will be hereafter described with reference to the drawings. In each figure, the same components are denoted by the same numerals, and duplicate description for the components may be omitted.

In the one or more embodiments, when image data is transferred in accordance with a line synchronization signal, a phase locked loop (PLL) of a receiver-side circuit is unlocked due to noise such as static electricity, and consequently an abnormal image appears in a received image. In such a case, image data in an abnormal image section is corrected based on identification information for an abnormal line image as well as information indicating a given section of the abnormal image that is included in the abnormal line image.

In this description, the abnormal line image refers to a line image with an abnormal image, where the line image is among line images that are included in a received image. The abnormal image refers to a portion of a received image where image data is lost due to transfer error, or a portion of the received image where noise is increased. A locked state of the PLL means that an output signal of the PLL is synchronized with a reference clock. The "PLL being unlocked" means an unlocked state of the PLL.

First Embodiment

<Overall Configuration of Image Processing Apparatus 1 According to Embodiment>

Figure 1:
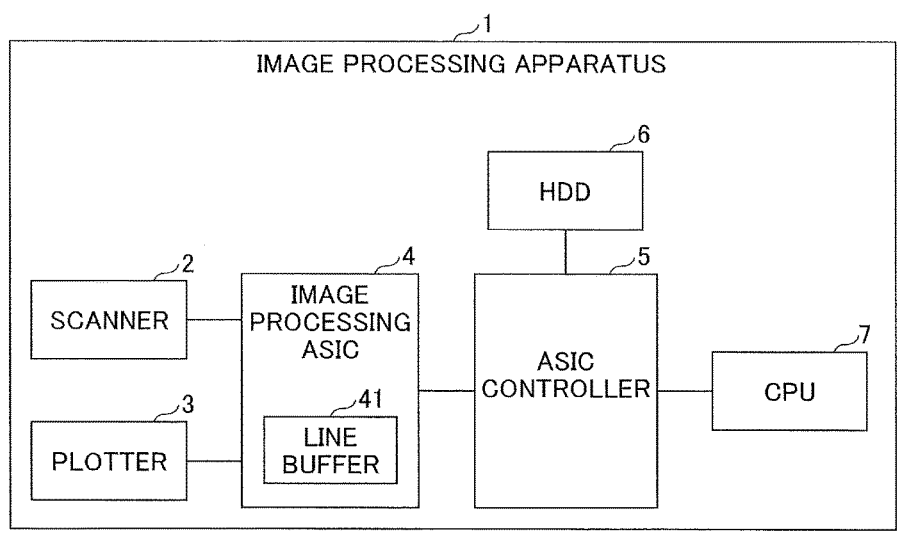
FIG. 1 is a block diagram illustrating an example of the overall configuration of an image processing apparatus according to one or more embodiments.

FIG. 1 is a block diagram illustrating an example of the overall configuration of an image processing apparatus 1 according to the present embodiment. As illustrated in FIG. 1, the image processing apparatus 1 includes a scanner 2, a plotter 3, an image processing application-specific integrated circuit (ASIC) 4 (hereafter referred to as an ASIC 4), an ASIC controller 5 (hereafter referred to as a controller 5), a hard disk drive (HDD) 6 that is a storage, and a central processing unit (CPU) 7.

In a scanning process at the image processing apparatus 1, the scanner 2 captures a document image, and transfers captured image data to the ASIC 4. In a printing process at the image processing apparatus 1, the plotter 3 prints image data that is transferred from the ASIC 4, onto a recording medium such as a sheet.

In the scanning process, the ASIC 4 performs various processes with respect to an image that is captured by the scanner 2 and that is received from the scanner 2. The ASIC 4 also transfers a processed image to the controller 5. In the printing process, the ASIC 4 performs image processing suitable for writing of image data that is transferred from the controller 5, and then transfers the processed image data to the plotter 3.

The ASIC 4 includes a line buffer 41 for storing line images that are included in a received image.

Between the scanner 2 and the ASIC 4, image transfer is performed in accordance with a line synchronization signal. In such a manner, an image transfer clock, the line synchronization signal, the image data, and the like are transferred from the scanner 2 to the ASIC 4. The ASIC 4 employs, as a reference clock of the PLL, the clock received from the scanner 2, and then generates the image transfer clock for receiving the transferred image data.

In the scanning process, the controller 5 stores the image data transferred from the ASIC 4, in the HDD 6. In the printing process, the controller 5 also transfers the image data that is stored in the HDD 6, to the ASIC 4.

The CPU 7 controls access to the HDD 6 through the controller 5.

<Function Configuration of ASIC 4>

Figure 2:
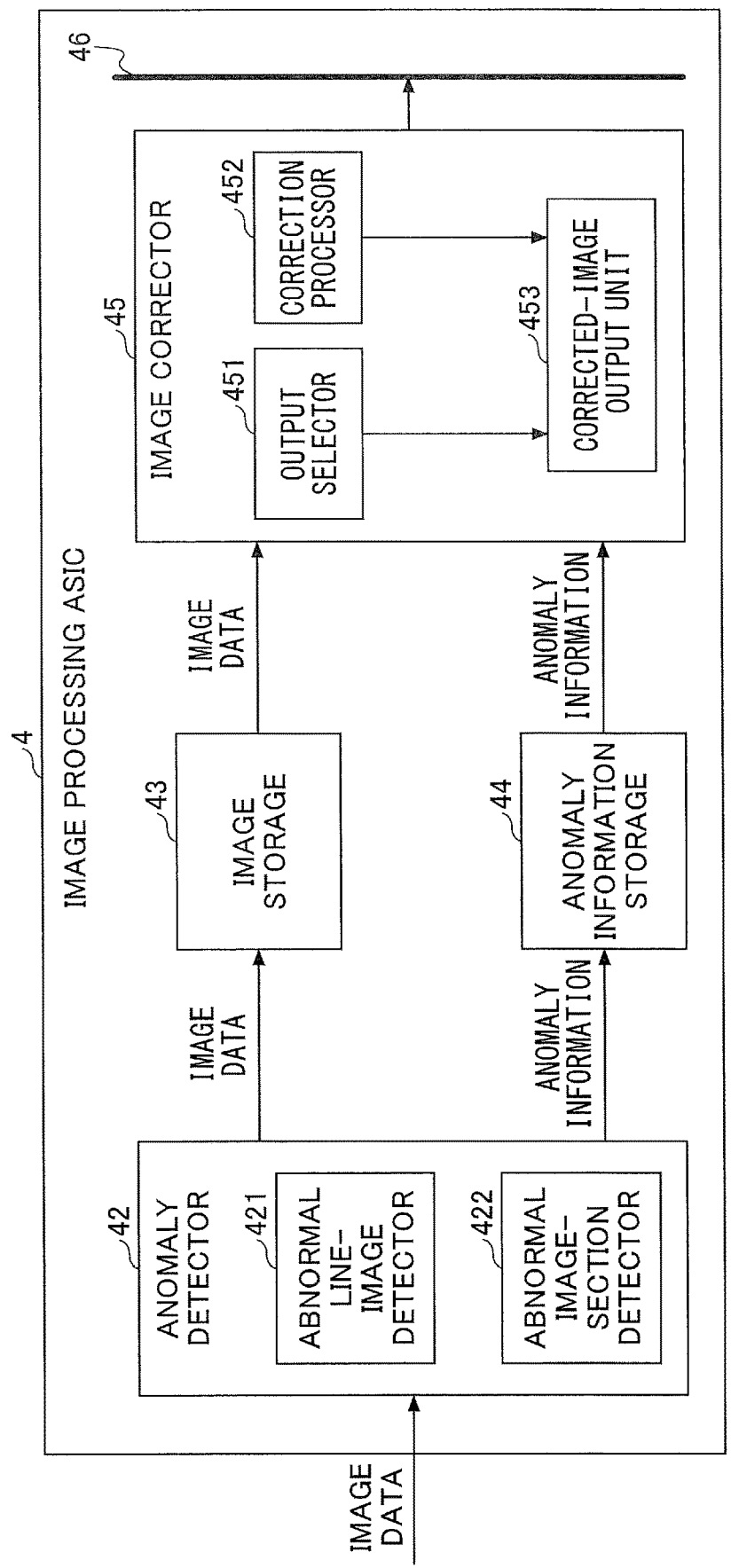
FIG. 2 is a block diagram illustrating an example of the functional configuration of an image processing ASIC according to a first embodiment.

Hereafter, the functional configuration of the ASIC 4 in the image processing apparatus 1 will be described. FIG. 2 is a block diagram illustrating an example of the functional configuration of the ASIC 4. As illustrated in FIG. 2, the ASIC 4 includes an anomaly detector 42, an image storage 43, an anomaly information storage 44, an image corrector 45, and an internal bus 46.

The anomaly detector 42 outputs, to the image storage 43, image data consisting of a plurality of line images that are included in an image received from the scanner 2. The anomaly detector 42 includes an abnormal line-image detector 421 and an abnormal image-section detector 422. The anomaly detector 42 detects an abnormal image in the received image. The anomaly detector 42 also outputs, to the anomaly information storage 44, identification information for a given abnormal line image, as well as information indicating an abnormal image section of the detected abnormal line image.

The abnormal line-image detector 421 detects a given abnormal line image within the abnormal image, where the abnormal line image is among line images that are included in a given image received from the scanner 2. The abnormal line-image detector 421 also outputs identification information for the detected abnormal line image, to the anomaly information storage 44.

The abnormal image-section detector 422 detects a given abnormal image section. The abnormal image section is an image section corresponding to the detected abnormal image in the abnormal line image. The abnormal image-section detector 422 also outputs information indicating the detected abnormal image section, to the anomaly information storage 44.

The image storage 43 is implemented by a line buffer 41 or the like, and stores image data of a plurality of line images that are input from the anomaly detector 42. The image corrector 45 reads out the stored image data, and performs a correction process for the read image data.

The anomaly information storage 44 may be implemented by the line buffer 41 or the like. The anomaly information storage 44 receives, from the anomaly detector 42, one or more pieces of anomaly information for one or more lines of line images that are stored in the image storage 43. The anomaly information storage 44 also stores the input anomaly information associated with a given line image. The anomaly information includes identification information and information indicating a given abnormal image section, as described above. The anomaly information is stored in association with a given abnormal line image or a given normal line image, where each normal image does not have any abnormal image. For the anomaly information associated with a given abnormal line image, identification information for the abnormal line image, as well as information indicating a given abnormal image section, are set. For the anomaly information associated with a given normal line image, identification information for the normal line image, as well as information indicating that there is no abnormal image section, are set. The stored anomaly information is read out by the image corrector 45, in response to retrieving image data of a given line image from the image storage 43.

The image corrector 45 includes an output selector 451, a correction processor 452, and a corrected-image output unit 453. The image corrector 45 corrects, in real time, the abnormal image in a given abnormal line image that is stored in the image storage 43, based on anomaly information that is stored in the anomaly information storage 44. The image corrector 45 also outputs image data of a corrected abnormal line image, to the controller 5.

The output selector 451 outputs an instruction signal to the corrected-image output unit 453. The instruction signal is a signal to cause either of image data of a given line image that is retrieved from the image storage 43 or image data corrected by the correction processor 452, to be selected, as corrected image data by the image corrector 45, based on anomaly information that is retrieved from the anomaly information storage 44.

The correction processor 452 uses image data proximal to a given abnormal line image to calculate image data to be used for correcting the abnormal image. The correction processor 452 also outputs the calculated image data to the corrected-image output unit 453.

In response to receiving the instruction signal from the output selector 451, the corrected-image output unit 453 outputs either of image data of a given line image that is retrieved from the image storage 43 or image data corrected by the correction processor 452, to the controller 5 via the internal bus 46.

<Hardware Configuration of Anomaly Detector 42>

Figure 3:
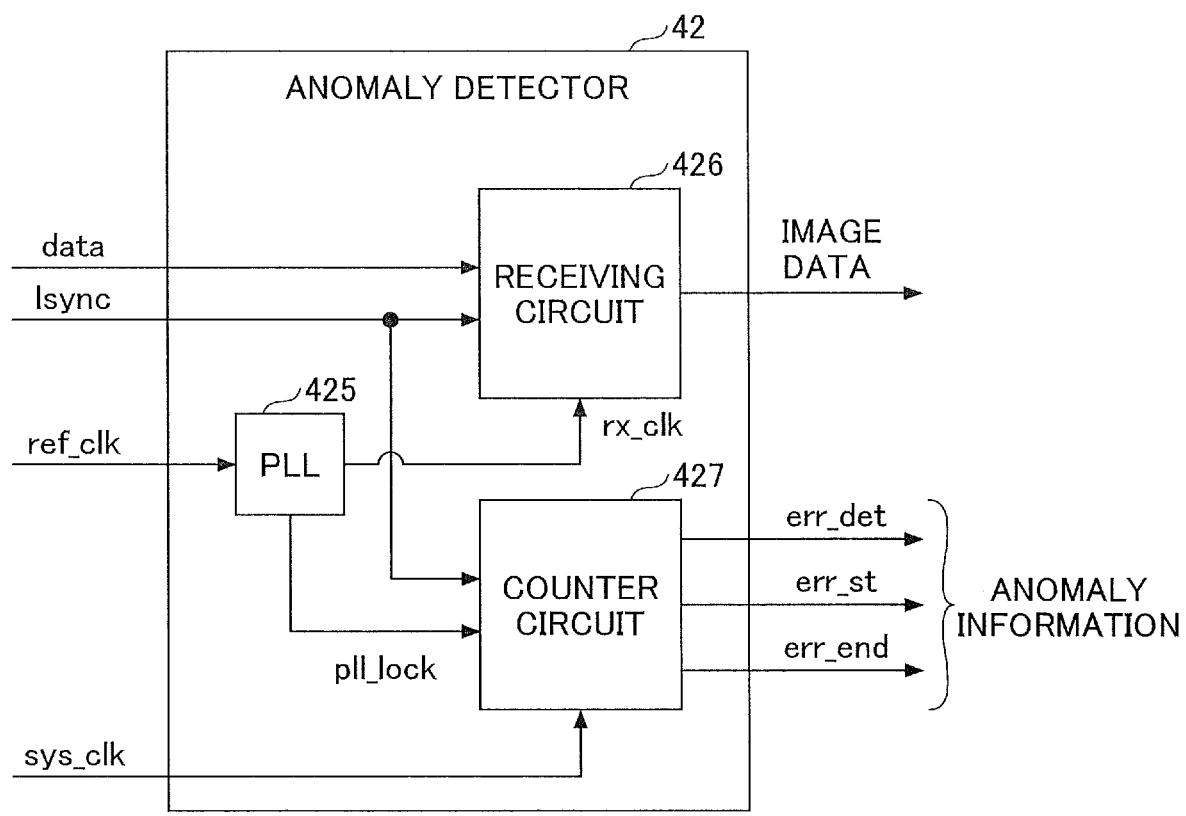
FIG. 3 is a block diagram illustrating an example of the hardware configuration of an anomaly detector according to the first embodiment.

Hereafter, the hardware configuration of the anomaly detector 42 in the ASIC 4 will be described. FIG. 3 is a block diagram illustrating an example of the hardware configuration of the anomaly detector 42. As illustrated in FIG. 3, the anomaly detector 42 includes a PLL 425, a receiving circuit 426, and a counter circuit 427. In this description, the counter circuit 427 is an example of a circuit that implements the function of the abnormal line-image detector 421. Also, the counter circuit 427 is an example of a circuit that implements the function of the abnormal image-section detector 422.

The PLL 425 in FIG. 3 is an electronic circuit that generates an image transfer clock to be used in the ASIC 4, based on the reference clock that is input from the scanner 2. The electronic circuit also outputs the generated image transfer clock to each of the receiving circuit 426 and the counter circuit 427.

The receiving circuit 426 is an electronic circuit that synchronizes each of image data and a line synchronization signal with the image transfer clock that is generated by the PLL 425, where the image data and the line synchronization signal are received from the scanner 2. The electronic circuit also outputs the synchronized image data to the image storage 43.

The counter circuit 427 includes a counter that operates based on a system clock. The counter circuit 427 is an electronic circuit that monitors a locked state of the PLL 425.

Each signal illustrated in FIG. 3 will be described below. The data $_{data}$ represents the image data that is transferred from the scanner 2, and the signal $_{lsync}$ represents the line synchronization signal that is transferred from the scanner 2, where the line synchronization signal is transferred together with the image data. The clock $_{ref\_clk}$ represents the reference clock that is transferred from the scanner 2, where the reference clock is transferred together with the image data.

The clock $_{rx\_clk}$ represents the image transfer clock that is generated by the PLL 425, based on the reference clock $_{ref\_clk}$. The clock $_{pll\_lock}$ represents the lock signal indicating that the PLL 425 is locked with respect to the reference clock $_{ref\_clk}$.

The clock $_{sys\_clk}$ represents the system clock that is supplied from a different oscillator, where the system clock is set at the same frequency as a given clock that is used for image transfer. The signal $_{err\_det}$ represents the anomaly detection signal indicating that the PLL 425 is unlocked during transfer of a given line image.

The value $_{err\_st}$ represents the count value that is counted by the counter circuit 427 at a timing at which the PLL 425 is unlocked. The value $_{err\_end}$ represents the count value that is counted by the counter circuit 427 at a timing at which the PLL 425 is re-locked. Each of the count value $_{err\_st}$ and the count value $_{err\_end}$ is stored in a register.

The anomaly detection signal $_{err\_det}$, the count value $_{err\_st}$ and the count value $_{err\_end}$ are detected for each line associated with image data. In such a case, the anomaly detection signal $_{err\_det}$, the count value $_{err\_st}$, and the count value $_{err\_end}$ are cleared in accordance with a given line synchronization signal. Likewise, the count value count counted by the counter circuit 427 is also cleared in accordance with a given line synchronization signal.

<Anomaly Detection Process by Anomaly Detector 42>

Figure 4:
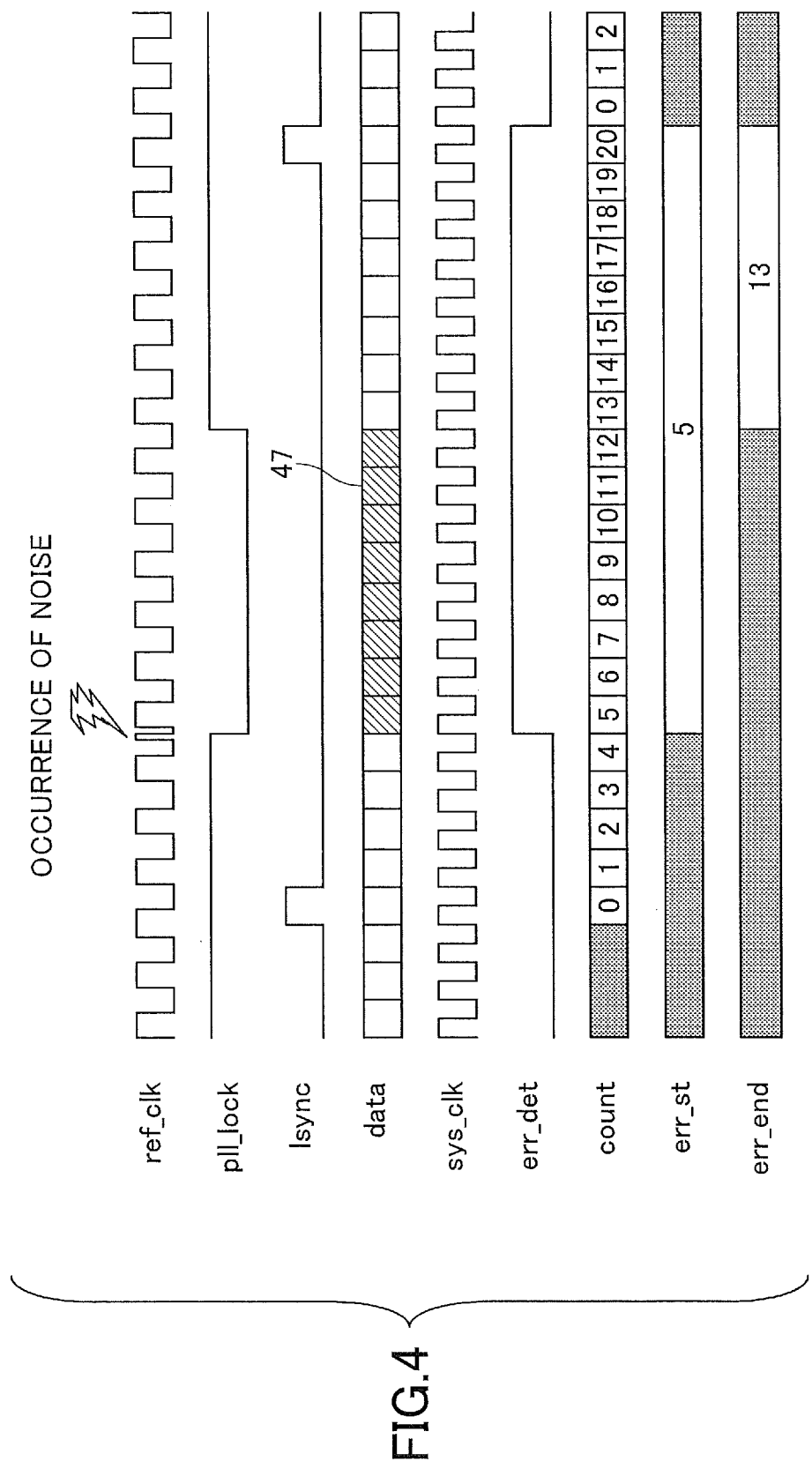
FIG. 4 is a diagram for describing an example of the process of detecting an abnormality according to the first embodiment.

FIG. 4 is a diagram illustrating an example of the process performed by the anomaly detector 42. In sequential order from a top row to a bottom row in FIG. 4, the reference clock $_{ref\_clk}$, the lock signal $_{pll\_lock}$, the line synchronization signal $_{lsync}$, the image data $_{data}$ the system clock $_{sys\_clk}$, the anomaly detection signal $_{err\_det}$, the count value $_{count}$, the count value $_{err\_st}$ and the count value $_{err\_end}$ are illustrated.

In FIG. 4, when noise caused by static electricity or the like is superimposed on image data during reception of a single line of the image data, the PLL is unlocked and consequently operations based on the image transfer clock $_{rx\_clk}$ malfunction. Thus, a transfer error occurs. As a result, in a period until the PLL is re-locked, the ASIC 4 cannot successfully receive the reference clock $_{ref\_clk}$ and image data $_{data}$, and thus image data $_{data}$ becomes an abnormal image. Even if the noise caused by static electricity or the like is instantaneous, once the PLL is unlocked, a certain amount of time is required to re-lock the PLL, and, during the time the PLL is unlocked, the received image data is abnormal. For the image data $_{data}$ illustrated in FIG. 4, image data 47 shaded with diagonal hatching indicates the image data of such an abnormal image.

At a timing at which the PLL is unlocked, the lock signal $_{pll\_lock}$ is negated and the anomaly detection signal $_{err\_det}$ is asserted.

The counter circuit 427 detects transfer errors due to noise, based on the lock signal $_{pll\_lock}$. Upon detecting a transfer error, the counter circuit 427 receives the line synchronization signal $_{lsync}$ for a subsequent line image, while outputting identification information to the anomaly information storage 44. The identification information indicates an anomaly when the anomaly detection signal $_{err\_det}$ is at a high level. In contrast, the identification information indicates normal when the error detection signal $_{err\_det}$ is at a low level. In such a manner, the anomaly information storage 44 stores the identification information indicating an anomaly or the identification information indicating normal.

The counter circuit 427 operates in accordance with a clock from a different oscillator from an oscillator that oscillates the reference clock $_{ref\_clk}$ for image transfer, where the clock is set at the same frequency as the image transfer clock $_{rx\_clk}$. The counter circuit 427 also counts received image data (pixels) for each line. In this case, a count value at the timing at which the PLL is unlocked is used to identify a starting-point pixel of a given abnormal image section. Also, a count value at the timing at which the PLL is re-locked is used to identify an ending-point pixel of the abnormal image section. The counter circuit 427 outputs these count values to the anomaly information storage 44. The output count values are stored in the anomaly information storage 44.

In the example illustrated in FIG. 4, the value "5" is output as the count value $_{err\_st}$, where the value "5" is set at the timing at which the PLL is unlocked and thus the lock signal $_{pll\_lock}$ falls. Additionally, the value "13" is output as the count value $_{err\_end}$ where the value "13" is set at the timing at which the PLL is re-locked and thus the lock signal $_{pll\_lock}$ rises.

<Example of Image Data and Anomaly Information>

Figure 5A:
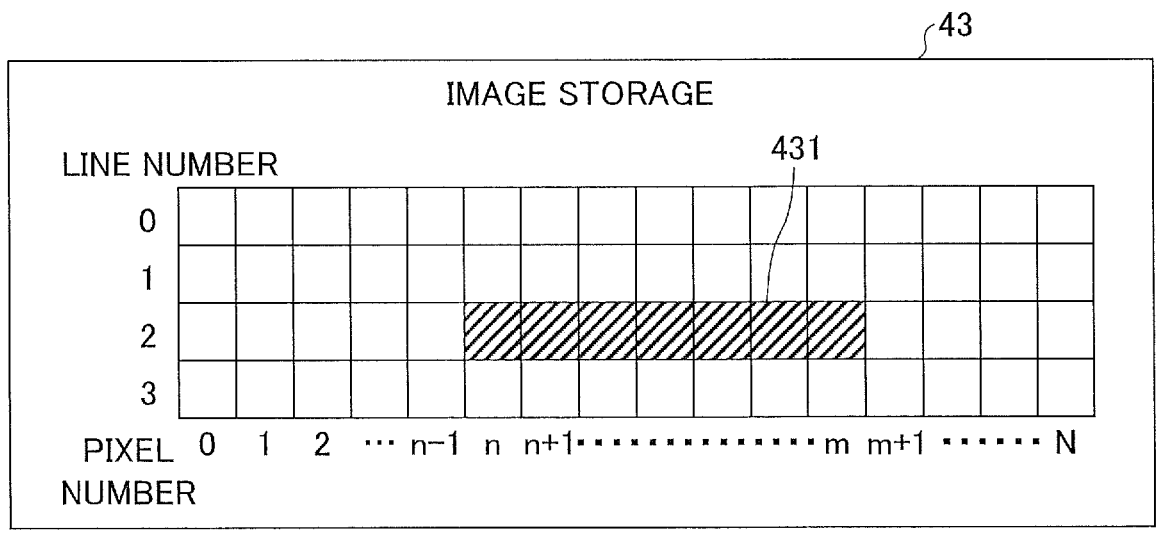
FIG. 5A is a diagram illustrating an example of line images including an abnormal image according to the first embodiment.
Figure 5B:
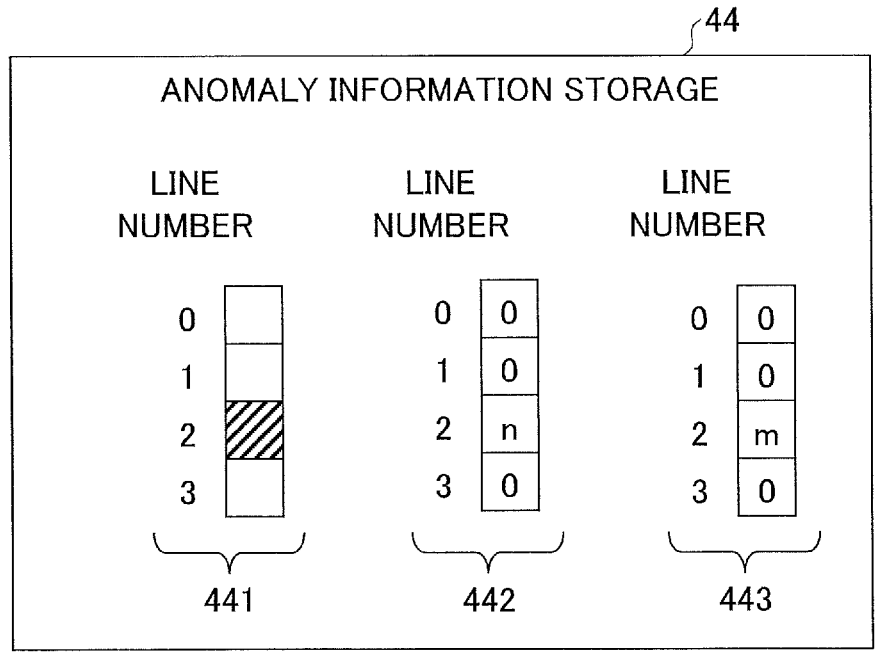
FIG. 5B is a diagram illustrating an example of anomaly information according to the first embodiment.

FIGS. 5A and 5B are diagrams illustrating an example of stored image data and anomaly information. FIG. 5A is a diagram illustrating line images that are stored in the image storage 43. FIG. 5B is a diagram illustrating anomaly information that is stored in the anomaly information storage 44.

In the example in FIG. 5A, the line buffer 41 capable of storing four line images is used to store image data. In the example in FIG. 5A, image data stored at line number 0 designates the most recent line image data received from the scanner 2. Further, line image data stored at a higher line number, such as order of line number 1, line number 2, and line number 3, indicates preceding image data.

Each square of a grid illustrated in FIG. 5A represent a pixel of image data, and the image storage 43 stores four line images that are specified by line numbers 0, 1, 2, and 3. An abnormal image section 431 shaded with diagonal hatching represents the section of a given abnormal image.

As illustrated in FIG. 5A, the line image at line number 2 is a line image with an abnormal image. For a section of the line image at line number 2, the section starting from an n-th pixel and ending with an m-th pixel is an abnormal image section of the abnormal image.

The identification information 441 illustrated in FIG. 5B is information indicating whether a given line image is an abnormal line image with an abnormal image. In FIG. 5B, each square not shaded with hatching represents a given normal line image, and each square shaded with diagonal hatching represents a given abnormal line image. A line image at line number 2 is an abnormal line image, where identification information indicating the abnormal line image is stored. In contrast, line images at line numbers 0, 1, and 3 are normal line images, where each identification information indicating a given normal line image is stored.

A given starting-point pixel number 442 in FIG. 5B represents a pixel number indicating a starting point of a given abnormal image. A given ending-point pixel number 443 represents a pixel number indicating an ending point of a given abnormal image. In this example, the line image at line number 2 is an abnormal line image, where the pixel number "n", indicating a starting point of the abnormal image, is stored as the ending-point pixel number 443, and the pixel number "m", indicating an ending point of the abnormal image, is stored as the ending-point pixel number 443. In contrast, line images at line numbers 0, 1, and 3 are normal images. In this case, for each line image, zero is stored as each of a given starting-point pixel number 442 and a given ending-point pixel number 443.

<Hardware Configuration of Image Corrector 45>

Figure 6:
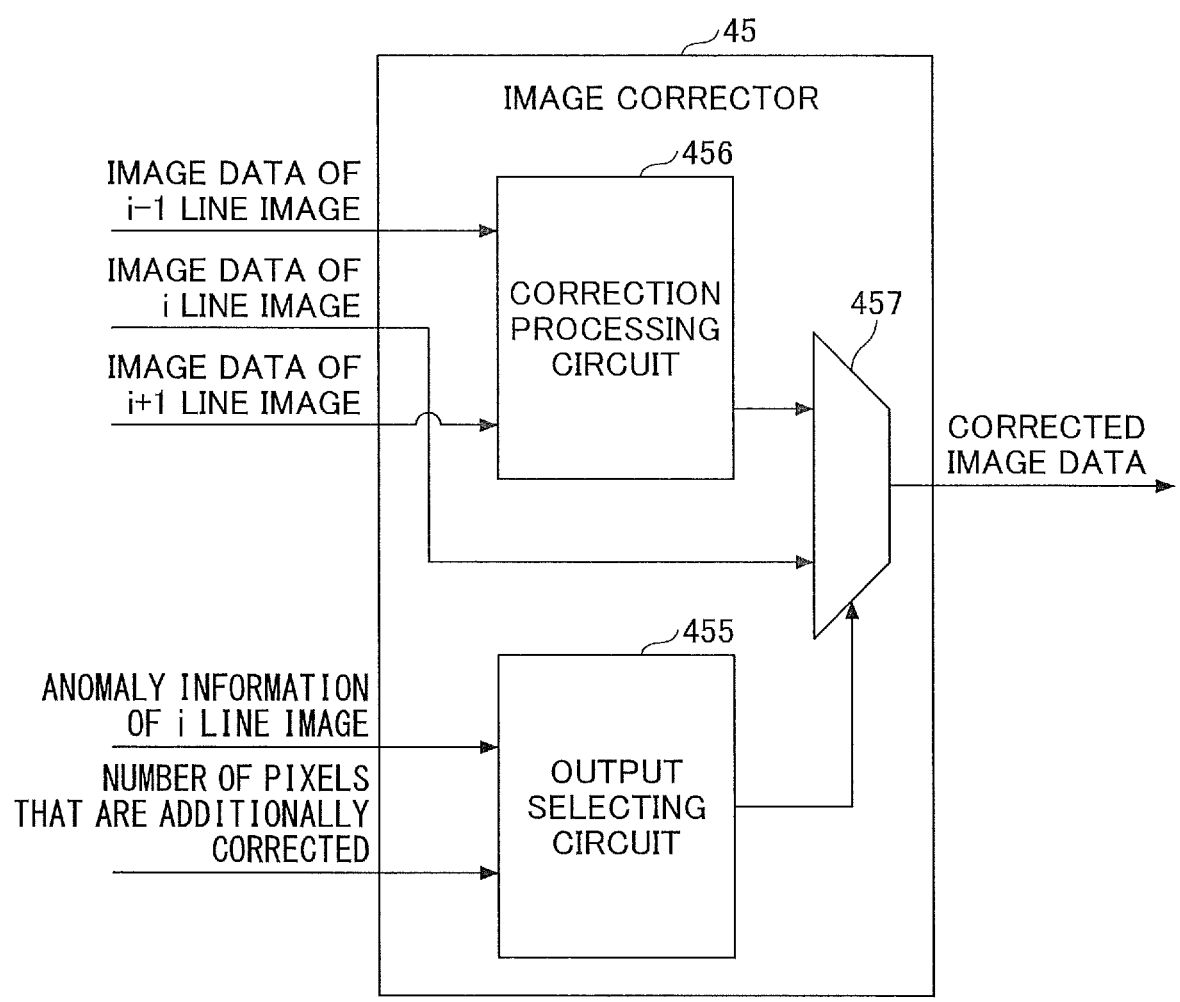
FIG. 6 is a block diagram illustrating an example of the hardware configuration of an image corrector according to the first embodiment.

Hereafter, the hardware configuration of the image corrector 45 in the ASIC 4 will be described. FIG. 6 is a block diagram illustrating an example of the hardware configuration of the image corrector 45. As illustrated in FIG. 6, the image corrector 45 includes an output selecting circuit 455, an correction processing circuit 456, and an image output interface (I/F) 457. The output selecting circuit 455 is an example of the output selector 451, the correction processing circuit 456 is an example of the correction processor 452, and the image output I/F 457 is an example of the corrected-image output unit 453.

The image corrector 45 reads out, as a target line image, image data of the line image at line number i, among multiple line images that are stored in the image storage 43. The image corrector 45 also reads out pieces of image data of line images at line numbers i−1 and i+1 that are set before and after the line number i. Then, the image corrector 45 uses the pieces of image data to perform an correction process. Note that in the following description, the line image at the line number i−1 is referred to as an i−1 line image, the line image at the line number i is referred to as an i line image, and the line image at the line number i+1 is referred to as an i+1 line image.

Before the image corrector 45 retrieves image data of a given line image from the image storage 43, the output selecting circuit 455 selects image data corrected by the image corrector 45, based on anomaly information of the i line image that is retrieved from the anomaly information storage 44.

When the identification information 441 associated with anomaly information does not indicate an abnormal line image, the output selecting circuit 455 selects image data of the i-line image, as corrected image data.

In contrast, when the identification information 441 indicates an abnormal line image, the output selecting circuit 455 selects corrected image data, based on the following conditions (1) through (3).

(1) When the pixel number of a given pixel to be read is less than a number given by the formula of "starting-point pixel number−the number of pixels that are additionally corrected," image data of the i line image is selected as corrected image data.

(2) When the pixel number of a given pixel to be read is greater than or equal to a number given by the formula of "starting-point pixel number−the number of pixels that are additionally corrected," and is less than or equal to a number given by the formula of "ending-point pixel number+the number of pixels that are additionally corrected," image data set after correction is selected as corrected image data.

(3) When the pixel number of a given pixel to be read is greater than a number given by the formula of "ending-point pixel number+the number of pixels that are additionally corrected," image data of the i line image is selected as corrected image data.

In other words, when the identification information 441 indicates an abnormal line image, the output selecting circuit 455 selects, as corrected image data, image data set after correction, in a given abnormal image section of the abnormal line image. In contrast, for a section other than the abnormal image section, the output selecting circuit 455 selects image data of the i line image, as corrected image data.

In this description, the number of pixels that are additionally corrected refers to the number of pixels set as a margin for adjusting a given abnormal image section, where the margin is set in consideration of the following factors. The factors include a phase deviation of a low voltage differential signaling (LVDS) transfer clock that is received from the scanner 2, relative to an operation clock of the counter circuit 427, as well as including a delay time from occurrence of noise to an unlocked state of the PLL, and the like. The number of pixels that are additionally corrected is an example of a "predetermined number." The number of pixels that are additionally corrected is suitably set in advance in consideration of device characteristics or the like.

The correction processing circuit 456 calculates an average pixel value for image data of the i−1 line image and image data of the i+1 line image, and outputs the calculated average pixel value to the image output I/F 457. However, the correction processing circuit 456 may output image data of either of the i−1 line or the i+1 line, without calculating the average pixel value described above. In such a manner, the correction process can be performed with use of the line buffer 41 that can store either of image data of the i−1 line image or image data of the i+1 line image, as well as storing image data of the i line image to be read. In view of the manner described above, the correction process uses less of the capacity of the available line buffer 41.

In accordance with a selected result by the output selecting circuit 455, the image output I/F 457 outputs either of image data at the line number i that is retrieved from the image storage 43 or image data that is a result obtained in the correction process that is performed by the correction processing circuit 456, to the controller 5 via the internal bus 46.

Figure 7A:
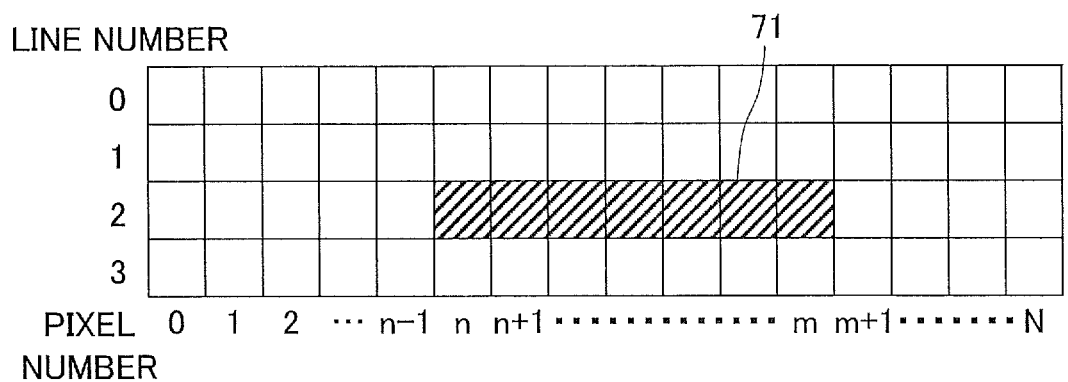
FIG. 7A is a diagram illustrating an example of the line images including the abnormal image according to the first embodiment.
Figure 7B:
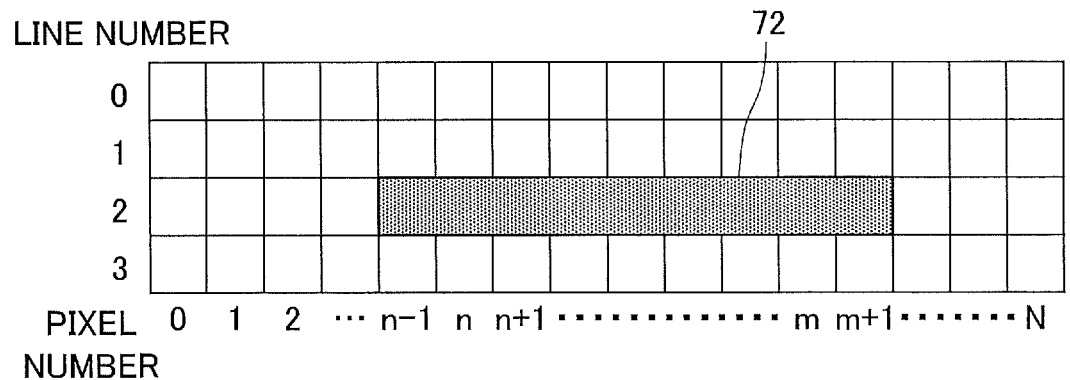
FIG. 7B is a diagram illustrating an example of the line images with a corrected abnormal image according to the first embodiment.

FIGS. 7A and 7B are diagrams illustrating an example of the corrected result by the image corrector 45. FIG. 7A is a diagram illustrating line images with an abnormal image. FIG. 7B is a diagram illustrating the line images with a corrected abnormal image. In the example in FIG. 7A, the starting-point pixel number and the ending-point pixel number in a given abnormal image section are n and m, respectively. The number of pixels that are additionally corrected is 1.

In FIG. 7A, a pixel value of image data of each pixel in an abnormal image section 71 of the i line image is replaced with an average pixel value for image data of a given pixel in an i−1 line image section corresponding to the i line abnormal image section 71 and image data of a given pixel in an i+1 line image section corresponding to the i line abnormal image section 71. Specifically, for example, a pixel value of image data of the i line image at a pixel number n is replaced with an average pixel value for image data of the i−1 line image at the pixel number n and image data of the i+1 line image at the pixel number n.

In such a manner, as illustrated in FIG. 7B, image data in an abnormal image section 72 is corrected. The number of pixels that are additionally corrected is 1. In this case, the abnormal image section 72, as illustrated in FIG. 7B, is longer by one pixel in each of a positive direction and a negative direction along a main scanning direction, in comparison to the abnormal image section 71.

<Process by ASIC 4>

Figure 8:
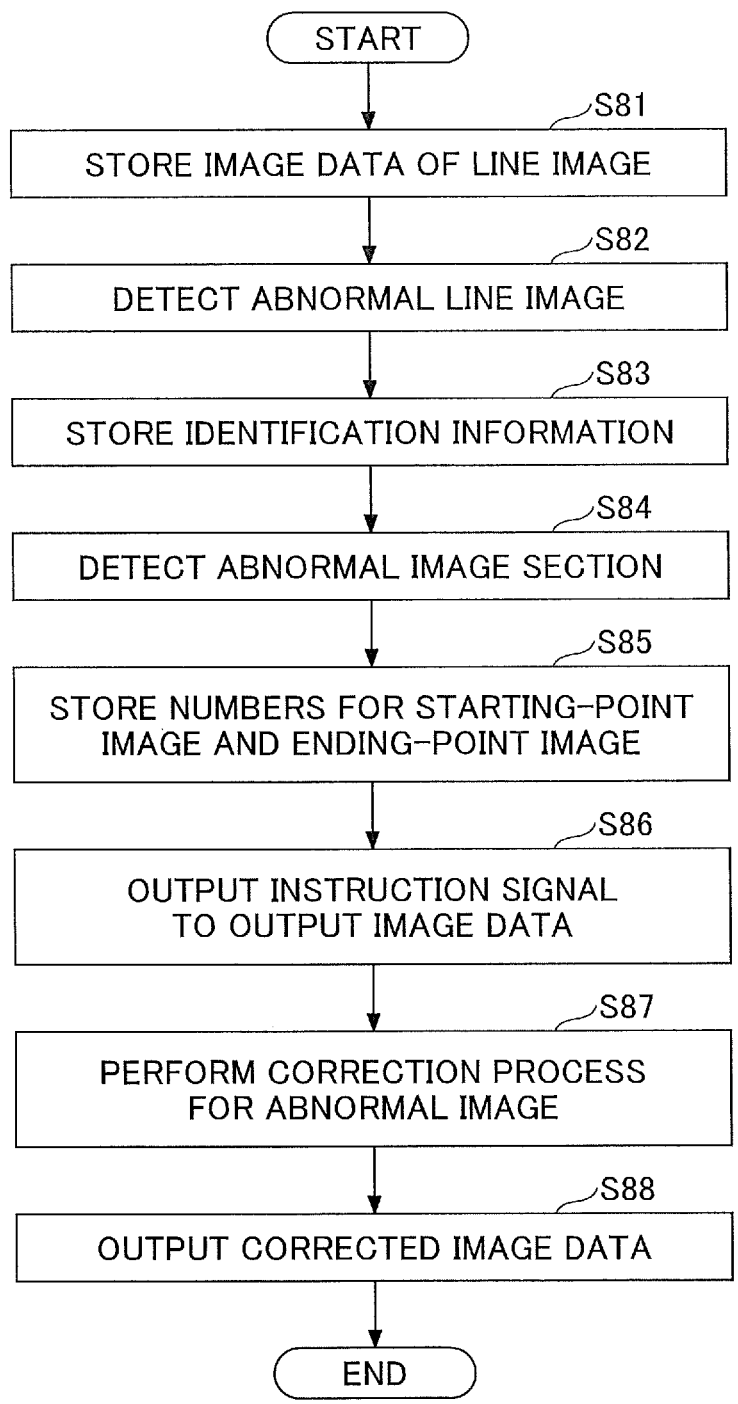
FIG. 8 is a flowchart illustrating an example of the process performed by the image processing ASIC according to the first embodiment.

Hereafter, FIG. 8 is a flowchart illustrating an example of the process performed by the ASIC 4.

In step S81, the image storage 43 stores image data of multiple line images that are included in an image, where the image is received from the scanner 2 through the anomaly detector 42.

In step S82, the abnormal line-image detector 421 detects an abnormal line image among the line images that are stored in the image storage 43.

In step S83, the anomaly information storage 44 stores identification information 441 for each of the line images that are stored in the image storage 43.

In step S84, the abnormal image-section detector 422 detects an abnormal image section of the abnormal line image that is detected by the abnormal line-image detector 421.

In step S85, for each of the line images that are stored in the image storage 43, the anomaly information storage 44 stores the starting-point pixel number 442 and the ending-point pixel number 443.

In step S86, the output selector 451 outputs an instruction signal to the corrected-image output unit 453. The instruction signal causes the output selector 451 to select the image data of either a given line image retrieved from the image storage 43 or the image data corrected by the correction processor 452 as the corrected image data, based on anomaly information retrieved from the anomaly information storage 44.

In step S87, the correction processor 452 calculates image data to be used to correct the detected abnormal image, based on image data proximal to the abnormal line image, and then outputs the calculated image data to the corrected-image output unit 453.

In step S88, in response to receiving the instruction signal from the output selector 451, the corrected-image output unit 453 outputs either of the image data of a given line image that is retrieved from the image storage 43 or the image data corrected by the correction processor 452, to the controller 5 via the internal bus 46.

As described above, the ASIC 4 can detect the abnormal image included in image data that is transferred from the scanner 2, to correct the detected abnormal image.

<Effect of Image Processing Apparatus 1 According to First Embodiment>

The effect of the image processing apparatus 1 will be described below.

For an image processing apparatus such as an MFP (multi-function production/printer/peripheral) or a printer, when a document is scanned by the scanner 2, and then a scanned image is transferred to the ASIC 4, banding may occur in the scanned image.

As an analyzed result by the inventor of this application, it has been recognized that banding occurs in the ASIC 4 on a receiver-side of image data to be transferred to the LVDS. One cause of the occurrence of banding is that a PLL is unlocked due to an external factor such as static electricity.

In the related art recognized by the inventor, for all pixels for a single line, even when only a few pixels represent an abnormal image, all the pixels for the one line are corrected, and consequently one or more normal pixels are corrected. Thus, a received image may be wholly deteriorated.

In contrast, in the present embodiment, image data of the i−1 line image and the i+1 line image, which are line images proximal to a given abnormal line image, is used to correct image data for the given abnormal image section, based on identification information for the abnormal line image in a received image, as well as information indicating the abnormal image section of the abnormal line image.

In such a manner, image data in a section other than the abnormal image section of the abnormal line image is not corrected. Thus, one or more normal pixels is not corrected, thereby preventing the overall deterioration of the received image. In other words, the abnormal image can be corrected without degrading the received image.

Further, in the present embodiment, image data in a given abnormal image section of the abnormal line image is corrected. Further, image data of the same number of pixels as the number of additionally corrected pixels that are positioned beyond the end of the abnormal image section containing the abnormal line image is corrected. Thus, influence of phase deviation of the LVDS transfer clock output from the scanner 2, relative to the operation clock of the counter circuit 427 can be reduced, as well as reducing influence of a delay time from occurrence of noise to an unlocked state of the PLL, and the like. The phase deviation or the delay time depends upon characteristics of a given device such as the scanner 2. Accordingly, image data in a minimum section of the abnormal line image can be corrected.

Furthermore, in the present embodiment, the anomaly detector 42 detects a given abnormal image section in the locked state of the PLL 425. If a given abnormal line image is detected based on image data, a given circuit may be increased in size because the circuit includes a circuit such as a CRC (cyclic redundancy check)-enabled circuit or an 8b/10b decoding circuit. However, according to the present embodiment, the size of the detecting circuit can be reduced because a given abnormal line image is detected in the locked state of the PLL 425.

In the present embodiment, image data of the i line image is replaced with image data of either the i−1 line image or the i+1 line image, to correct a given abnormal image. In this case, one line image is used to correct the abnormal image, and thus the correction process uses less of the capacity of the available line buffer 41 in comparison to a case where both the line images above and below the i line image are used to correct a given abnormal image. In a case where both line images are used to correct the abnormal image, for example, the pixel value of the i line image is replaced with an average pixel value for image data of the i−1 line image and image data of the i+1 line image.

Second Embodiment

Hereafter, an image processing apparatus 1a according to a second embodiment will be described.

<Configuration of Image Processing Apparatus 1a According to Second Embodiment>

Figure 9:
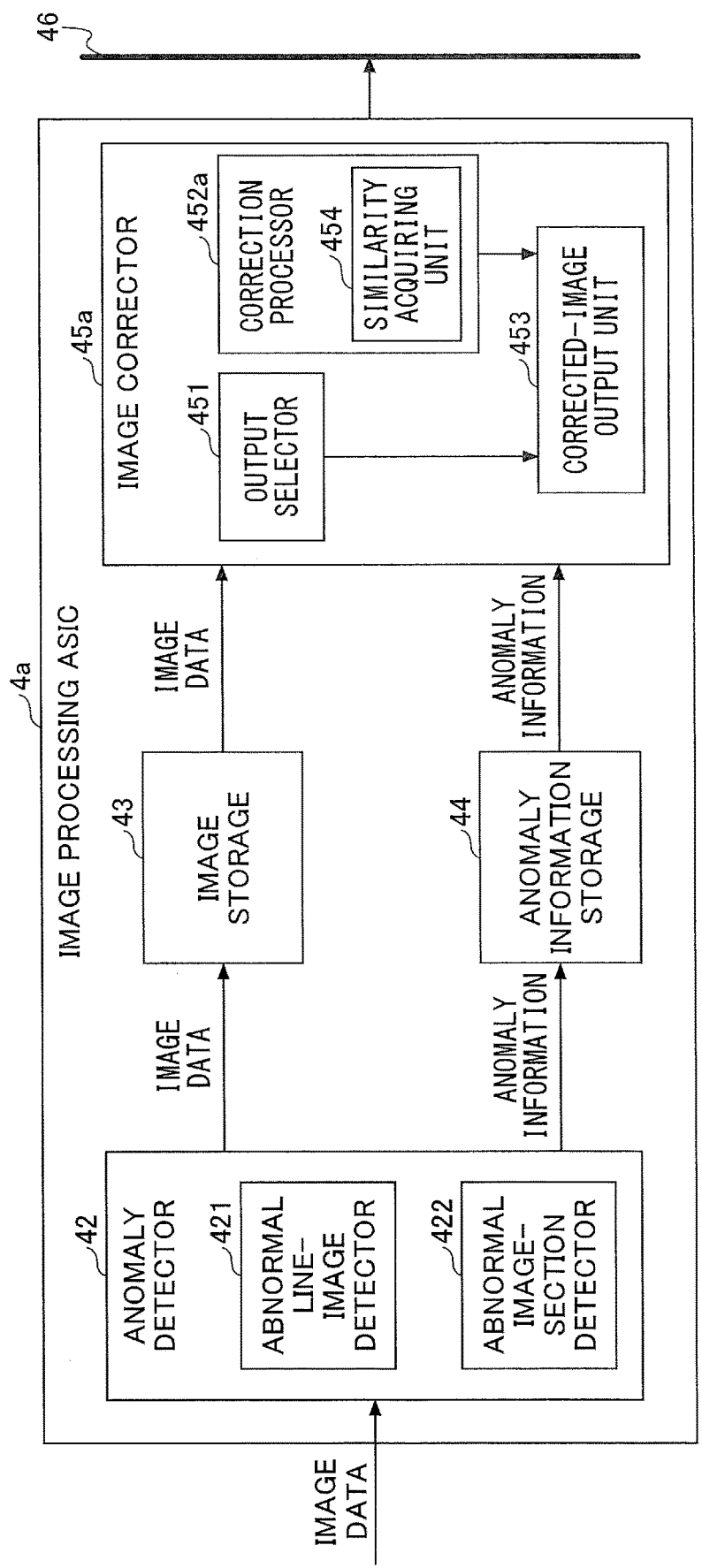
FIG. 9 is a block diagram illustrating an example of the functional configuration of the image processing ASIC according to a second embodiment.

FIG. 9 is a block diagram illustrating an example of the functional configuration of an image processing ASIC 4a provided in the image processing apparatus 1a. As illustrated in FIG. 9, an image corrector 45a included in the image processing ASIC 4a (hereafter referred to as ASIC 4a) includes a correction processor 452a with a similarity acquiring unit 454.

For a section of which one or more pixel numbers for a given abnormal line image are less than a number given by the formula of "starting-point pixel number−the number of pixels that are additionally corrected," the similarity acquiring unit 454 acquires a similarity between image data of the i line image, which is a target line image to be retrieved from the image storage 43, and image data of each of the i−1 line image and the i+1 line image above and below the i line image.

Note that a given similarity may be acquired for a section of which one or more pixel numbers for a given abnormal line image is greater than a number given by the formula of "ending-point pixel number+the number of pixels that are additionally corrected," instead of the above section of which one or more pixel numbers for a given abnormal line image are less than a number given by the formula of "starting-point pixel number−the number of pixels that are additionally corrected." In this case, the similarity acquiring unit 454 acquires a given similarity based on image data in a section other than the abnormal image section of a given abnormal line image.

In the following description, for convenience of explanation, a similarity between image data of the i line image and image data of the i−1 line image is referred to as a similarity A, and a similarity between image data of the i line image and image data of the i+1 line image is referred to as a similarity B.

When the similarity is calculated, a pixel value of image data for each target pixel is subtracted from a pixel value of image data for a given different pixel to calculate a given difference, and then the sum of an absolute difference (SAD), which is a total sum of absolute values of differences, is calculated. The conventional calculation method other than the SAD may be adopted to determine a given similarity.

The correction processor 452a compares the similarity A with the similarity B. When the similarity A is greater, the correction processor 452a replaces image data in a given abnormal image section of the i line image with image data of the i−1 line image, and thus corrects a given abnormal image. In contrast, when the similarity B is greater, image data in a given abnormal image section of the i line image is replaced with image data of the i+1 line image and thus a given abnormal image is corrected.

Figure 10:
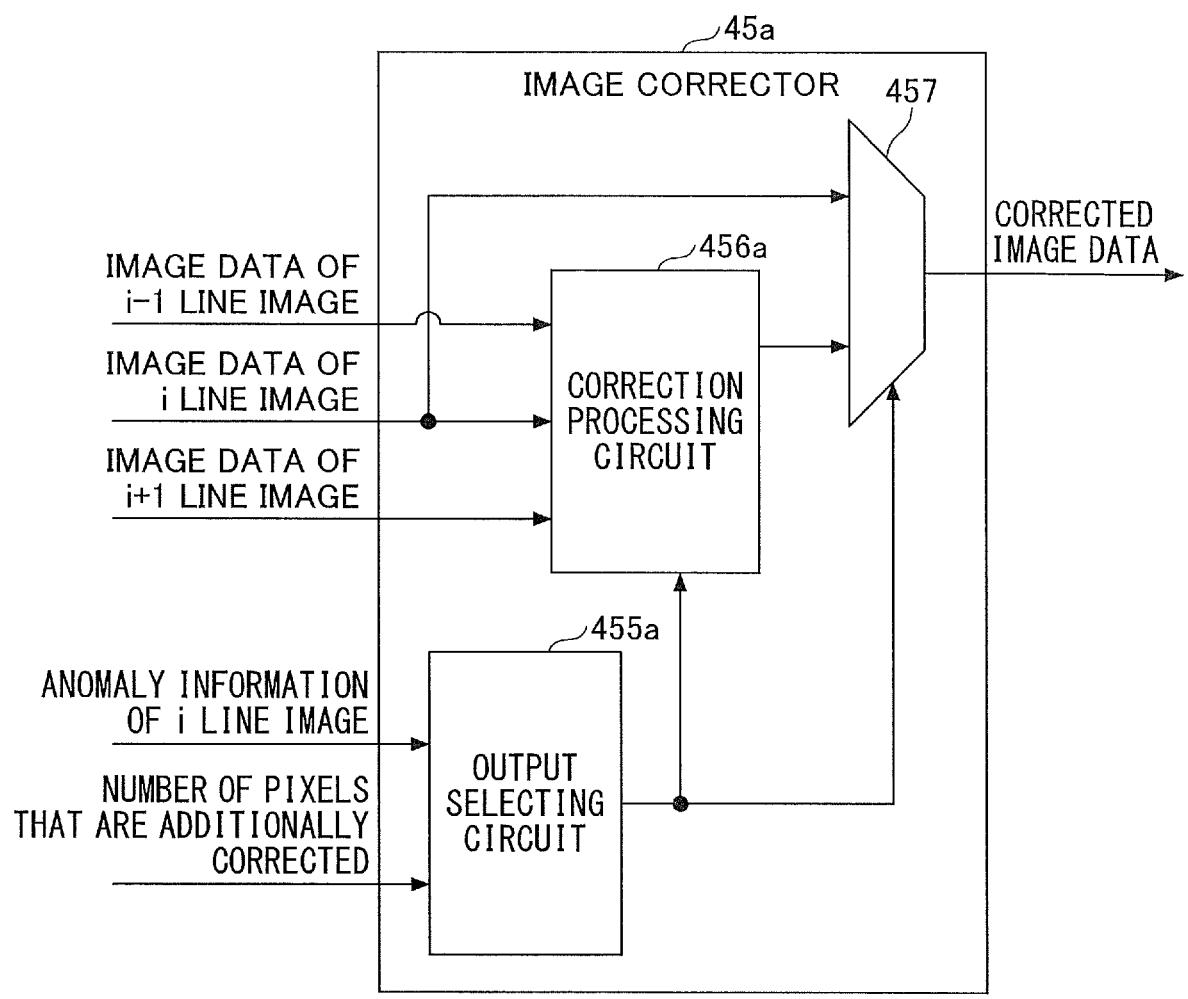
FIG. 10 is a block diagram illustrating an example of the hardware configuration of the image corrector according to the second embodiment.

FIG. 10 is a block diagram illustrating an example of the hardware configuration of the image corrector 45a of the ASIC 4a. As illustrated in FIG. 10, image data of the i line image is input to the image output I/F 457 and a correction circuit 456a. The correction circuit 456a is an example of the correction processor 452a. The correction circuit 456a implements the function of the correction processor 452a described above.

<Effect of Image Processing Apparatus 1a According to Second Embodiment>

When an abnormal line image marks a boundary between a color area and a monochrome area, the abnormal line image is replaced with a line image having the greater similarity of either a line image above the abnormal line image or a line image below the abnormal image, and thus the abnormal line image is corrected. In such a manner, the corrected image data becomes more natural in comparison to a case where a pixel value of the abnormal line image is replaced with an average pixel value for line images above and below the abnormal line image. Thus, according to the present embodiment, a given abnormal line image is replaced with a given line image having the greater similarity of either the line image above the abnormal line image or the line image below the abnormal image, and thus the abnormal line image is corrected. Thus, the resulting corrected image appears more natural.

In contrast, when a given abnormal line image is a gradient image in the main scanning direction, a pixel value of the abnormal line image is replaced with an average pixel value for line images above and below the abnormal line image, as described in the first embodiment. In such a manner, the corrected image data becomes more natural in comparison to the case where the pixel value in the abnormal line image is replaced with either of a pixel value in the line preceding the abnormal line or a pixel value in the line following the abnormal line. In this case, a threshold for a similarity is preliminarily set, and further, when neither of acquired similarities A and B exceed the threshold, an average pixel value for image data of line images in the lines preceding and following the abnormal line is preferably used to correct the abnormal line image.

Note that effects other than the above-mentioned effects are the same as those described in the first embodiment.

Third Embodiment

In the embodiments described above, the abnormality occurs due to noise during transfer for one line, and then such an abnormal state normally recovers during the transfer for the same line. However, a timing at which the abnormality occurs, as well as a timing at which the abnormal state normally recovers, are not made during transfer for the same one line, and consequently the abnormality may occur during transfer for multiple lines.

FIGS. 11A and 11B are timing charts illustrating an example of occurrence of the abnormality for multiple lines. FIG. 11A is a timing chart illustrating occurrence of the abnormality in image data. FIG. 11B is a timing chart illustrating occurrence of the abnormality in both of image data and a line synchronization signal.

As illustrated in FIG. 11A, abnormal image data 112 arises before and after one line synchronization signal 111. In this example, abnormal image data is produced across two lines.

In FIG. 11B, a line synchronization signal 113 represents a line synchronization signal that is lost due to the abnormality. Depending on noise such as static electricity, the abnormality may occur in both of the line synchronization signal 113 and abnormal image data 114.

Figure 12:
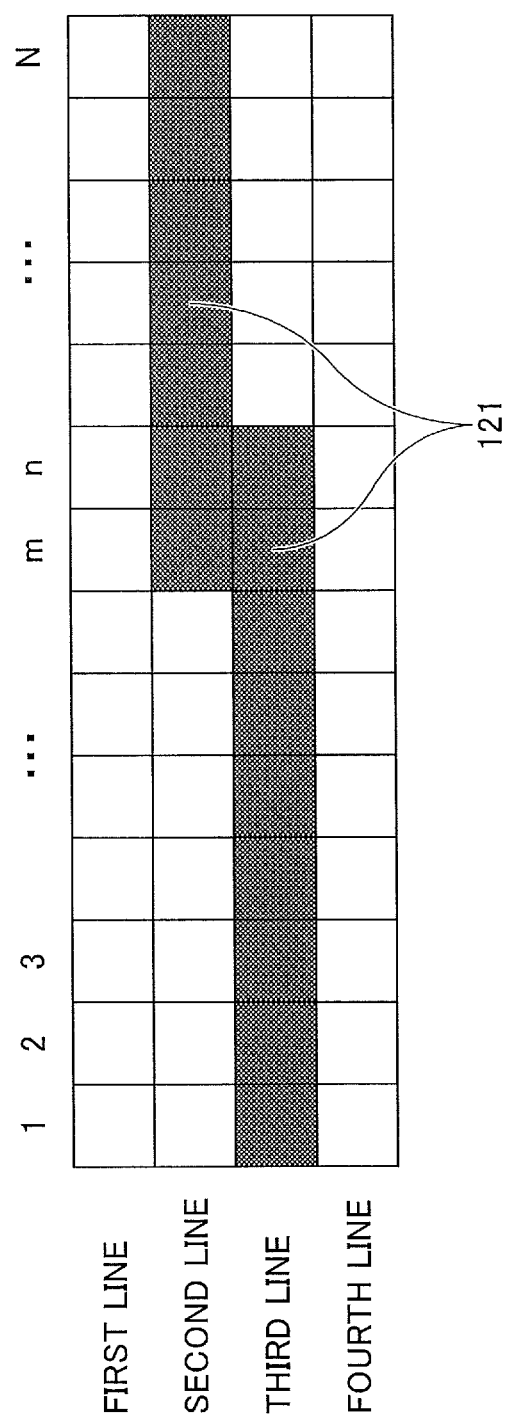
FIG. 12 is a diagram illustrating abnormal images extending across multiple lines.

FIG. 12 is a diagram illustrating an example of an abnormal image extending across multiple lines. Pixels 121 highlighted in FIG. 12 represent pixels constituting a given abnormal image. In the example in FIG. 12, an m-th pixel and n-th pixel for a second line are abnormal pixels, and an m-th pixel and n-th pixel for a third line are also abnormal pixels.

In this case, the m-the pixels and n-th pixels for the second line and third line are abnormal pixels. For this reason, a pixel value of each of the m-th pixel and n-th pixel for the third line cannot be used to correct a pixel value of a given pixel among the m-th pixel and n-th pixel for the second line preceding the third line, and further, a pixel value of each of the m-th pixel and n-th pixel for the second line cannot be used to correct a pixel value of a given pixel among the m-th pixel and n-th pixel for the third line below the second line.

Accordingly, in the present embodiment, it is determined whether abnormal pixels extend across multiple lines. If abnormal pixels extend across multiple lines, a given abnormal pixel can be corrected based on a given normal pixel for either of a given normal line preceding a target abnormal line associated with the abnormal pixel or a given normal line below the target abnormal line. In this case, a given abnormal line immediately set preceding or following a target abnormal line associated with a given abnormal pixel is not referenced.

Figure 13:
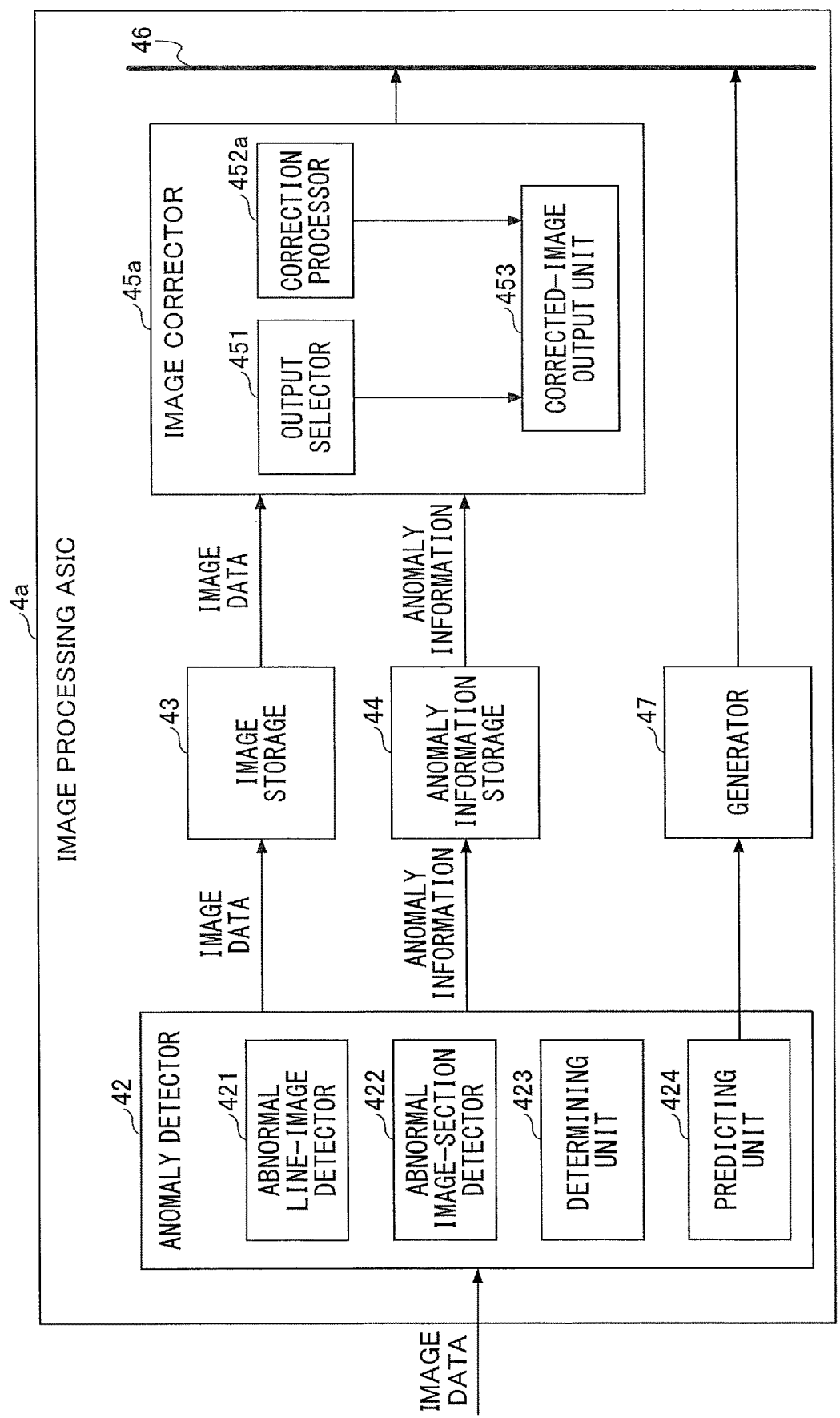
FIG. 13 is a block diagram illustrating an example of the functional configuration of the image processing ASIC according to one embodiment.

FIG. 13 is a block diagram illustrating an example of the functional configuration of the ASIC 4a. As illustrated in FIG. 13, the ASIC 4a includes an anomaly detector 42a, an image corrector 45a, and a generator 47. The anomaly detector 42a includes a determining unit 423 and a predicting unit 424. The image corrector 45a includes a correction processor 452a.

The determining unit 423 determines whether abnormal pixels extends across multiple lines based on positions of an abnormal starting-point pixel and an abnormal ending-point pixel in each of one or more abnormal image sections. The abnormal image sections are detected by the abnormal image-section detector 422. The determining unit 423 also outputs a determined result to the image corrector 45a.

If it is determined that abnormal pixels extend across multiple lines, in a case where one or more abnormal pixels for only a given one line among the multiple lines exist, the correction processor 452a corrects the pixel value of the given abnormal pixel for the one line, based on an average pixel value for given line pixels that are placed in the lines preceding and following the one line. Further, in a case where abnormal pixels are present in two adjacent lines, the correction processor 452a uses, for an upper line among the two lines, a pixel value of a normal line pixel above a given abnormal pixel, to correct the abnormal pixel for the upper line, and further, the correction processor 452a uses, for a lower line among the two lines, a pixel value of a normal line pixel below a given abnormal pixel, to correct the abnormal pixel for the lower line.

When a line synchronization signal is lost due to electrostatic noise or the like, the predicting unit 424 uses an average value $_{Avg}$ and a standard deviation $_\sigma$ for previous cycles of the line synchronization signal, to predict a timing at which a corrected line synchronization signal is to be asserted, where the previous cycles of the line synchronization signal are calculated based on one or more count values $_{count}$. The predicting unit 424 also outputs a predicted result to the generator 47. Note that when the abnormality occurs in a given line synchronization signal, the predicting unit 424 determines that noise occurs, and can prevent a corrected line synchronization signal from being asserted.

The generator 47 receives the predicted result from the predicting unit 424, generates a corrected line synchronization signal at a predicted timing, and outputs the generated corrected line synchronization signal to a receiving device via the internal bus 46. Thus, the loss of image data for one line, due to a failure of the receiving device to detect the start of the process for a subsequent line, may be avoided.

Figure 14:
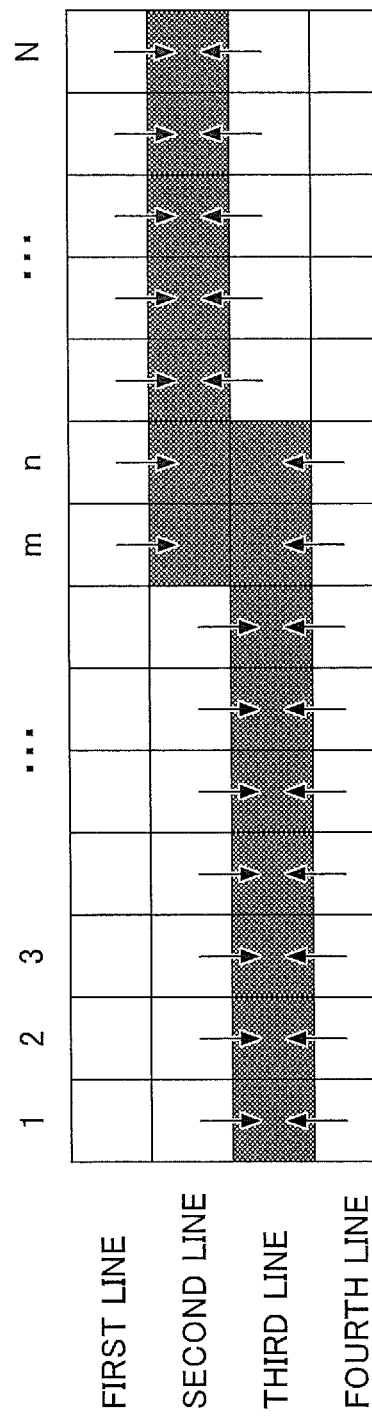
FIG. 14 is a diagram illustrating an example of pixels that the correction processor references in a correction process according to one embodiment.

FIG. 14 is a diagram illustrating an example of pixels that the correction processor 452a references, in the correction process.

If it is determined that abnormal pixels extend across multiple lines, in a case where one or more abnormal pixels (in FIG. 14, for each of the second line and third line, a given abnormal pixel at a given pixel number other than pixel numbers of m and n) are present in only one given line among the multiple lines, the correction processor 452a corrects the pixel value of the given abnormal pixel in the one given line, based on an average pixel value for line pixels that are placed in the lines preceding and following the one line.

Further, when given abnormal pixels (in FIG. 14, the pixels 121 at the pixel numbers m and n for the second line and the third line) exist across adjacent two lines, the correction processor 452a corrects a given abnormal pixel for an upper line (second line in FIG. 14) among the two lines, based on a given pixel value of the pixel, for a given line (first line in FIG. 14) preceding the upper line, at the same pixel number as the number of the abnormal pixel for the upper line. Further, the correction processor 452a corrects a given target abnormal pixel for a lower line (third line in FIG. 14) among the two lines, based on a given pixel value of the pixel for a given line (forth line in FIG. 14) preceding the lower line, where the given pixel value of the pixel for the given line (forth line in FIG. 14) is a pixel at the same pixel number as the number of the target abnormal pixel.

In such a manner, even when abnormality occurs across multiple lines, pixel values for abnormal pixels can be corrected.

Figure 15:
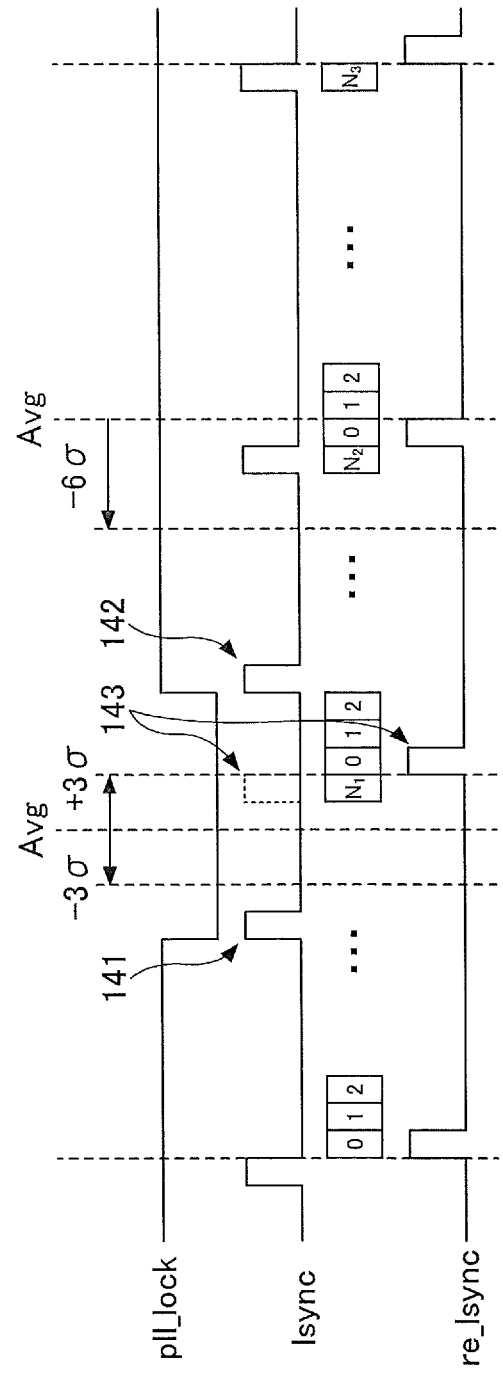
FIG. 15 is a diagram illustrating an example of a method of generating a corrected line synchronization signal according to one embodiment.

FIG. 15 is a diagram illustrating an example of the method of generating a corrected line synchronization signal when a given line synchronization signal is lost due to occurrence of the abnormality across multiple lines.

The predicting unit 424 (see FIG. 12) calculates the average value $_{Avg}$ and the standard deviation $_\sigma$ for previous cycles of the line synchronization signal, based on one or more count values $_{count}$, to predict a timing at which the corrected line synchronization signal is to be asserted. Such a prediction process, as well as the process of generating a corrected line synchronization signal based on a predicted result, are performed in a period during which the signal $_{pll\_lock}$ indicates an unlocked state of the PLL.

When line synchronization signals, such as signals 141 and 142 in FIG. 15, are asserted out of a range defined by Avg±3σ (where, Avg represents the above average value $_{avg}$, and a represents the standard deviation $_\sigma$), the predicting unit 424 determines that the asserted signals are noise, and consequently the generator 47 does not assert a corrected line synchronization signal.

When a given line synchronization signal is asserted within the range defined by Avg±3σ, the synchronization signal is determined to be a normal line synchronization signal, and thus the generator 47 asserts a corrected line synchronization signal. Further, when a given line synchronization signal is asserted within the range defined by Avg±3σ, the predicting unit 424 determines that the line synchronization signal is lost, and thus the generator 47 asserts a generated corrected line synchronization signal 143.

For the line preceding a target line, when the line synchronization signal is asserted during a period while the PLL is unlocked, the line synchronization signal that is asserted under the condition of CNT<Avg−6σ, is determined to be noise, where CNT represents the count value $_{count}$. Thus, a corrected line synchronization signal is not asserted.

In this description, a certain time difference between a timing at which the line synchronization signal that is actually transmitted from an upper-stage device is asserted and a timing at which a given corrected line synchronization signal is asserted, is assumed to arise. In consideration of such a time difference, the value 6σ is used to provide a margin.

The count value $_{count}$ is not cleared at the timing at which the line synchronization signal is determined to be noise, and is cleared at the timing at which a given corrected line synchronization signal is asserted.

As described above, according to the present embodiments, it is determined whether abnormal pixels extend across multiple lines. If it is determined that abnormal pixels extend across multiple lines, in a case where one or more abnormal pixels for only a given one line among the multiple lines exist, the correction processor 452a corrects a pixel value of a given abnormal pixel in the one line, based on an average pixel value for given line pixels that are placed in the lines preceding and following the one line. Further, in a case where given abnormal pixels exist across adjacent two lines, the correction processor 452a uses a pixel value of a given normal line pixel above a given abnormal pixel that is placed in an upper line among the two lines, to thereby correct the abnormal pixel in the upper line, and further, the correction processor 452a uses a pixel value of a normal pixel below a given abnormal pixel that is placed for a lower line among the two lines, to thereby correct the abnormal pixel for the lower line.

In such a manner, when the abnormality occurs across two lines, pixel values for the multiple lines can be corrected without using both of pixel values of abnormal pixels for the two lines. Thus, an abnormal image can be corrected.

In the present embodiment, when a given line synchronization signal is lost due to electrostatic noise or the like, the average value $_{Avg}$ and the standard deviation $_σ$ for previous cycles of the line synchronization signal, to predict the timing at which the corrected line synchronization signal is to be asserted, where the previous cycles of the line synchronization signal are calculated based on one or more count values $_{count}$. Thus, a given generated corrected line synchronization signal is asserted. Accordingly, a single line of image data is prevented from being lost due to a failure of the receiving device to detect starting of the process for a subsequent line.

One or more embodiments have been described above, but the present disclosure is not limited to the particulars of the described embodiments. Various modifications or modifications can be made without departing from the scope defined in the present disclosure.

The embodiments are described using an example of the MFP or printer as an image processing apparatus. However, a device that performs line synchronization transfer to transfer a line synchronization signal and a reference clock, as well as image data, can be also widely adopted. In the embodiments, an example in which each functional component is implemented in hardware, such as an electronic circuit and an electrical circuit, is described. However, the CPU may execute a software program to implement each functional component.

In another embodiment, a method for processing images is provided. For example, the method includes correcting image data in a section of an abnormal image, based on information indicating the section, the abnormal image being included in an abnormal line image that is included in a received image. The method also includes outputting the corrected image data. In such a method, the effects can be obtained as in the image processing apparatus described above.

In another embodiment, a non-transitory storage medium storing a program that, when executed by a computer, causes the computer to execute a method, is provided. For example, the method includes correcting image data in a section of an abnormal image, based on information indicating the section, the abnormal image being included in an abnormal line image that is included in a received image. The method also includes outputting the corrected image data. In such a storage medium, the effects can be obtained as in the image processing apparatus described above.

The functions described in the above-mentioned embodiments can be implemented by one or more processing circuits. In this description, a "processing circuit" includes a processor or a device. The processor includes a processor such as an electronic circuit that executes programed instructions to perform each function described above. The device includes an application specific integrated circuit (ASIC), a digital signal processor (DSP), a field programmable gate array (FPGA), or a commonly used circuit module, which is designed to perform each function described above.

What is claimed is:

1. An image processing apparatus comprising:
a memory; and
processing circuitry electrically coupled to the memory, the processing circuitry being configured to:
correct image data in a section of an abnormal image, based on information that indicates a position of the section in an abnormal line image that is included in a received image; and
output the corrected image data.

2. The image processing apparatus according to claim 1, wherein the processing circuitry is configured to:
correct second image data of a predetermined number of pixels that are positioned beyond ends of the section of the abnormal image; and
output the corrected image data and the corrected second image data.

3. The image processing apparatus according to claim 1, further comprising a phase synchronization circuit,
wherein the processing circuitry is configured to detect the section of the abnormal image based on a locked state of the phase synchronization circuit.

4. The image processing apparatus according to claim 1, wherein the processing circuitry is configured to:
replace the image data in the section of the abnormal image with image data of a second line image proximal to the abnormal line image; and
output the image data of the second line image as the corrected image data.

5. The image processing apparatus according to claim 4, wherein the processing circuitry is configured to:
replace the image data in the section of the abnormal image with image data of the second line image, based on a similarity between image data in a section of the abnormal line image other than the section of the abnormal image and the image data of the second line image; and output the image data of the second line image as the corrected image data.

6. The image processing apparatus according to claim 1, wherein the processing circuitry is configured to:

detect abnormal images extending across multiple lines;

correct, upon detecting the abnormal images, image data of each of the detected abnormal images, in a different manner from a manner of correcting image data upon occurrence of a condition in which the abnormal image extending across the multiple lines fails to be detected; and output the corrected image data.

7. The image processing apparatus according to claim 6, further comprising a phase synchronization circuit, wherein the processing circuitry is configured to generate a corrected line synchronization signal based on a locked state of the phase synchronization circuit and previous cycles of a line synchronization signal.

8. A method for processing images comprising:

correcting image data in a section of an abnormal image, based on information that indicates a position of the section in an abnormal line image that is included in a received image; and outputting the corrected image data.

9. A non-transitory storage medium storing a program that, when executed by a computer, causes the computer to execute a method, the method comprising:

correcting image data in a section of an abnormal image, based on information that indicates a position of the section in an abnormal line image that is included in a received image; and outputting the corrected image data.

* * * * *